(12) United States Patent
Shin

(10) Patent No.: US 10,999,915 B2
(45) Date of Patent: May 4, 2021

(54) LIGHTING CONTROL DEVICE AND LIGHTING APPARATUS INCLUDING SAME

(71) Applicant: AMOSENSE CO., LTD, Cheonan-si (KR)

(72) Inventor: Gyu-Weon Shin, Daejeon (KR)

(73) Assignee: AMOSENSE CO., LTD, Chungcheongnam-Do (KR)

( * ) Notice: Subject to any disclaimer, the term of this patent is extended or adjusted under 35 U.S.C. 154(b) by 0 days.

(21) Appl. No.: 16/462,668

(22) PCT Filed: Nov. 21, 2017

(86) PCT No.: PCT/KR2017/013231
§ 371 (c)(1),
(2) Date: May 21, 2019

(87) PCT Pub. No.: WO2018/097567
PCT Pub. Date: May 31, 2018

(65) Prior Publication Data
US 2020/0077499 A1 Mar. 5, 2020

(30) Foreign Application Priority Data

Nov. 22, 2016 (KR) .................. 10-2016-0155457

(51) Int. Cl.
*H05B 47/20* (2020.01)
*H05B 47/14* (2020.01)
(Continued)

(52) U.S. Cl.
CPC .............. *H05B 47/20* (2020.01); *F21S 8/085* (2013.01); *H05B 47/19* (2020.01)

(58) Field of Classification Search
CPC ................................ Y02B 20/48; F21S 8/085
See application file for complete search history.

(56) References Cited

U.S. PATENT DOCUMENTS

2011/0291586 A1* 12/2011 Komagata .............. H05B 47/19
315/291
2012/0146066 A1* 6/2012 Tischler .................. H01L 27/32
257/89
(Continued)

FOREIGN PATENT DOCUMENTS

KR 20120061257 A 6/2012
KR 101180452 B1 9/2012
(Continued)

OTHER PUBLICATIONS

Lee, B. Hoi. ("Understand RGB LED mixing ratios to realize optimal color in signs and display." LEDs Magazine, May 14, 2013). (Year: 2013).*
(Continued)

*Primary Examiner* — Henry Luong
(74) *Attorney, Agent, or Firm* — CL Intellectual LLC

(57) ABSTRACT

The present disclosure provides a lighting control device having a power supply module and a control module formed integrally. The lighting control device is installed by replacing a power supply device mounted at a conventional lighting apparatus to connect the conventional lighting apparatus to a smart lighting system. The lighting control device controls the output (i.e., current) of the power supply module according to the number of LED modules or the number of the normally operating LED modules, thereby preventing a current exceeding a driving current from being applied to the LED module.

16 Claims, 11 Drawing Sheets

(51) Int. Cl.
*H05B 45/10* (2020.01)
*H05B 47/19* (2020.01)
*F21S 8/08* (2006.01)

(56) References Cited

U.S. PATENT DOCUMENTS

| | | | |
|---|---|---|---|
| 2014/0292208 A1* | 10/2014 | Chemel | H05B 47/11 |
| | | | 315/154 |
| 2015/0276192 A1* | 10/2015 | Kafry | F21V 23/003 |
| | | | 362/362 |
| 2016/0309568 A1 | 10/2016 | Wung et al. | |

FOREIGN PATENT DOCUMENTS

| | | | |
|---|---|---|---|
| KR | 20130139387 A | 12/2013 |
| KR | 101653739 B1 | 9/2016 |
| KR | 101656435 B1 | 9/2016 |

OTHER PUBLICATIONS

Office Action issued in Korean Application No. 10-2017-0155293, dated May 22, 2019.

* cited by examiner

LIGHTING CONTROL DEVICE AND LIGHTING APPARATUS INCLUDING SAME

CROSS-REFERENCE TO RELATED APPLICATION

This application is National Stage of International patent application PCT/KR2017/013231, filed on Nov. 21, 2017, which claims priority to foreign Korean patent application No. KR 10-2016-0155457, filed on Nov. 22, 2016, the disclosures of which are incorporated by reference in their entirety.

FIELD OF THE INVENTION

The present disclosure relates to a lighting control device and a lighting apparatus including the same, and more particularly, to a lighting control device and a lighting apparatus including the same, which control lighting appliances such as a street lamp and an illumination lamp.

BACKGROUND

LED lighting is increasingly supplied due to advantages such as low power consumption and high brightness. The LED lighting has been applied from a small space such as an office or a home, and recently is also applied to a street lamp, a parking lot, etc.

The LED lighting can easily be controlled by operating a switch when installed in the small space such as the office or the home.

However, there is a problem in that when the LED lighting is installed in a large space such as a street lamp or a parking lot, it is not easy to control by only the switch operation.

In order to solve such a problem, a smart lighting system for controlling the LED lights installed in the large space has been studied.

The smart lighting system performs a control of lighting, blinking, dimming, etc. of the LED lighting through the communication between the LED lighting and a control unit.

The lighting apparatus should be provided with functions such as communication and information collection in order to be interlocked to the smart lighting system. The newly installed lighting apparatus can be easily applied to the smart lighting system because it is produced by adding the functions such as communication and information collection.

However, there is a problem in that the previously-installed lighting apparatus cannot be interlocked to the smart lighting system because it does not have the functions of the communication function, the information collection, etc.

In addition, there is a problem in that it costs much to replace the conventional lighting apparatus with the lighting apparatus having the functions of the communication function, the information collection, etc.

SUMMARY OF THE INVENTION

The present disclosure is intended to solve the above conventional problems, and an object of the present disclosure is to provide a lighting control device installed in a lighting apparatus and for transmitting the collected lighting apparatus-related information to a control unit so that the previously-installed lighting apparatus can be interlocked with a smart lighting system.

Another object of the present disclosure is to provide a lighting control device for integrating a power supply module, a communication module, and a control module, and replacing a power supply device installed in the conventional lighting apparatus so that the conventional lighting apparatus can be interlocked with a smart lighting system.

In addition, still another object of the present disclosure is to provide a lighting control device for integrating a power supply module, a communication module, and a control module, and replacing a power supply device installed in the conventional lighting apparatus so that the conventional lighting apparatus can be interlocked with a smart lighting system.

In addition, yet another object of the present disclosure is to provide a lighting control device for replacing a replaceable communication module according to a communication method of a smart lighting system, and controlling the output of a power supply module according to the number of normally-connected LED modules.

In addition, still yet another object of the present disclosure is to provide a lighting apparatus, which disposes a lighting control device at a light pole, thereby facilitating maintenance.

In order to achieve the objects, a lighting control device according to an embodiment of the present disclosure forms a power supply module and a control module integrally to replace a conventional power supply device.

For this purpose, the lighting control device includes a plurality of lighting ports to which a LED module is connected, a power supply module for outputting power to the LED module, a control module for controlling an operation of the LED module based on a control signal of a smart lighting system, and a sensing module for sensing an operation state of the LED module.

The control module controls the output (i.e., current) of the power supply module according to the number of the LED modules connected to the lighting port or the number of the normally operating LED modules. That is, the control module reduces a current value of the DC power outputted from the power supply module when the LED module fails, thereby preventing a current exceeding a driving current from being applied to each LED module.

Meanwhile, the lighting control device can be disposed at a light pole of a lighting apparatus. For this purpose, the light pole is formed with an insertion hole for inserting the lighting control device, and the insertion hole is sealed through a cover.

According to the present disclosure, it is possible for the lighting control device to be added to the previously-installed lighting apparatus to perform the functions such as the communication function and the information collection, thereby constructing the smart lighting system using the conventional lighting apparatus.

In addition, it is possible for the lighting control device to construct the smart lighting system by using the conventional lighting apparatus, thereby minimizing the construction cost.

In addition, it is possible for the lighting control device to collect the status information on the lighting apparatus to manage the history, and to determine whether to replace it, thereby facilitating maintenance of the smart lighting system.

In addition, it is possible for the lighting control device to separately form the communication module so that it can be replaced according to the communication method, thereby preventing a reduction in the productivity due to a change in the communication module.

In addition, it is possible for the lighting control device to monitor the operation state of the LED module to determine whether it is a failure, thereby controlling the output of the power supply module to apply the power source having a constant current value to the LED module.

In addition, it is possible for the lighting control device to control the output of the power supply module to apply a constant current value to the LED module, thereby preventing the power supply having a current value exceeding a driving current to another LED module when a failure occurs to prevent breakage and a reduction in life span of the LED module.

In addition, it is possible for the lighting apparatus to dispose the lighting control device at the light pole of the street lamp, thereby facilitating maintenance because it can easily be replaced when a failure occurs.

DETAILED DESCRIPTION

Figure 1:
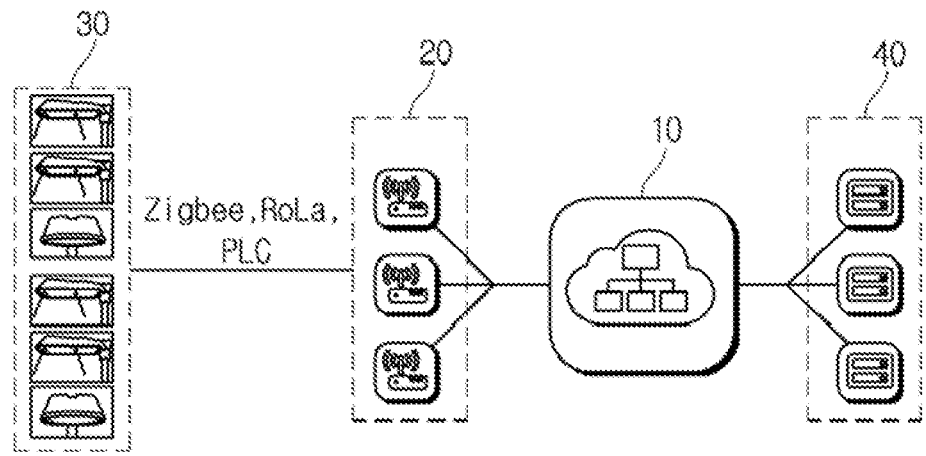
FIG. 1 is a diagram for explaining a smart lighting system.

Hereinafter, the most preferred embodiment of the present disclosure will be described with reference to the accompanying drawings so that those skilled in the art to which the present disclosure pertains can easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of known configurations or functions will be omitted when it is determined to obscure the subject matter of the present disclosure.

Referring to FIG. 1, a smart lighting system connects a plurality of lighting apparatuses 30 and an application server 40 through a network server 10 and a gateway 20 (or a concentrator).

The lighting apparatus 30 performs an operation according to a control signal received through the gateway 20. The lighting apparatus 30 performs operations such as lighting, blinking, dimming control, and a lighting rate according to a control signal.

The lighting apparatus 30 transmits operation state information related to the operation to the gateway 20 through communication methods such as LoRa, Zigbee, and PLC.

The gateway 20 receives a control signal from the application server 40 through the network server 10. The gateway 20 transmits the received control signal to the lighting apparatus 30. The gateway 20 collects and gathers the operation state information of the lighting apparatus 30. The gateway 20 transmits the operation state information to the application server 40 through the network server 10.

The application server 40 receives the operation state information of the lighting apparatus 30 through the gateway 20. The application server 40 analyzes the operation state information to monitor the state of the lighting apparatus 30.

The application server 40 transmits the control signal input from the administrator to the gateway 20. At this time, the application server 40 is, for example, an administrator terminal composed of a smart phone, a PDA, etc. The application server 40 can receive the operation state information of the lighting apparatus 30, and transmit the control signal.

The lighting apparatus 30 should be provided with functions such as communication and information collection in order to be interlocked with the smart lighting system.

Figure 2:
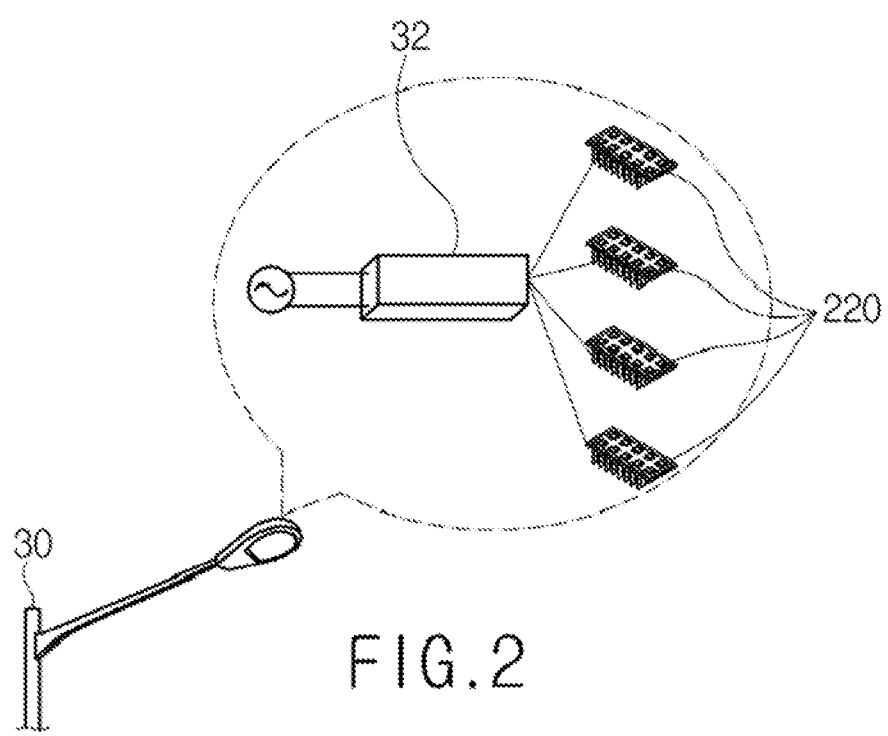
FIG. 2 is a diagram for explaining a general lighting apparatus.

Referring to FIG. 2, the general lighting apparatus 30 includes a power supply device 32 (Switching Mode Power Supply (SMPS)) and a plurality of LED modules 34.

The power supply device 32 converts AC power into DC power. The power supply device 32 outputs the converted DC power to the plurality of LED modules 34. The power supply device 32 outputs the DC power in a constant current output method.

The LED module 34 has an operation standard including a setting voltage and a setting current. The LED module 34 is operated by the DC power output from the power supply device 32.

The lighting control device according to a first embodiment of the present disclosure is applied to a lighting apparatus composed of a power supply device and a plurality of LED modules. The lighting control device additionally provides functions such as communication and information collection in order to interlock the conventional lighting apparatus to the smart lighting system.

Figure 3:
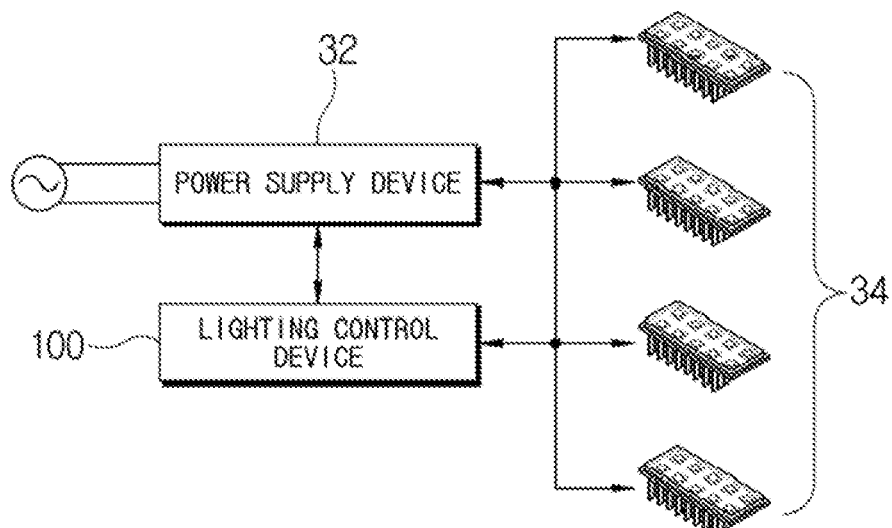
FIGS. 3 and 4 are diagrams for explaining a lighting control device according to a first embodiment of the present disclosure.

Referring to FIG. 3, a lighting control device 100 according to the first embodiment of the present disclosure is connected with the plurality of LED modules 34 and the power supply device 32.

The lighting control device 100 senses the plurality of LED modules 34 to sense an operation state of each LED module 34. At this time, the lighting control device 100 senses the state of the number of the connected LED modules 34, presence/absence of operation by number, etc.

The lighting control device 100 communicates with a server through wireless communication such as LoRa, ZigBee, Wi-Fi, and Wisun, or wired/wireless communication such as PLC. Herein, the server is, for example, the network server 10 and the application server 40 of the smart lighting system.

The lighting control device 100 receives a control signal from the server. The lighting control device 100 receives control signals related to lighting, blinking, dimming control, etc. of the LED module 34. The lighting control device 100 controls the plurality of LED modules 34. The lighting control device 100 transmits the control signal to the plurality of LED modules 34 to control the operation of the LED modules 34.

The lighting control device 100 senses the operation state of the LED module 34. The lighting control device 100 senses a voltage, a current, etc. of the LED module 34. The lighting control device 100 determines the operation state of the LED module 34 based on the sensed voltage and current to transmit it to the server.

Figure 4:
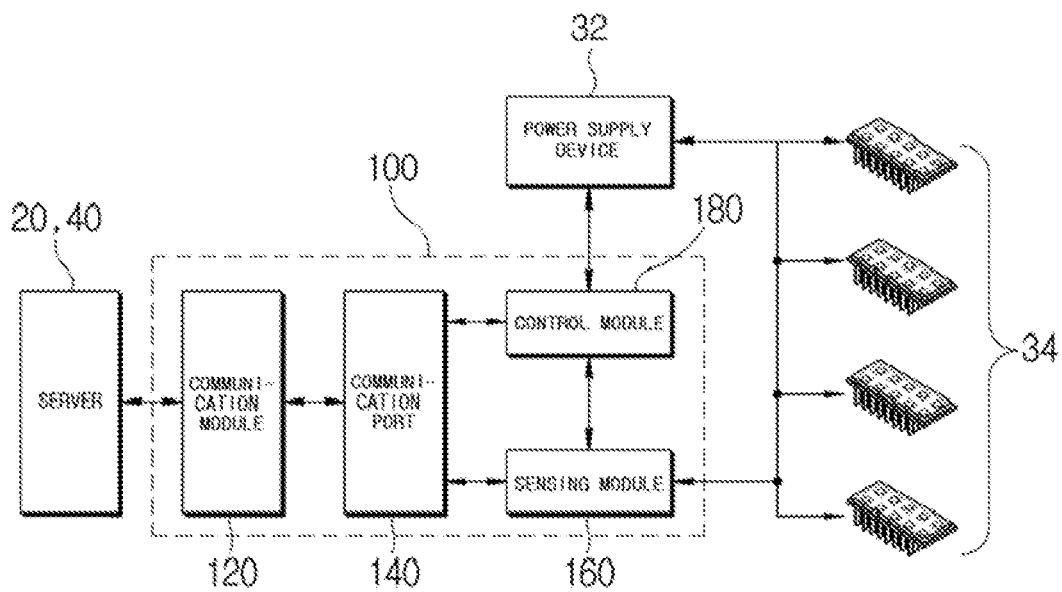

Referring to FIG. 4, the lighting control device 100 includes a communication module 120, a communication port 140, a sensing module 160, and a control module 180.

The communication module 120 transmits and receives the control signal and the operation state with the control module 180. The communication module 120 is composed of a device independent of the control module 180 or a printed circuit board. The communication module 120 is connected to the communication port 140 to transmit and receive the control signal and the operation state with the control module 180.

The communication module 120 converts the analog control signal received from an antenna into a digital type control signal. The communication module 120 converts a protocol of the control signal to transmit it to the communication port 140. For example, the communication module 120 converts the control signal, which is a protocol of one of low power Bluetooth (BLE), ZigBee, Z-Wave, LoRa, SIGFOX, Narrowband Internet of Things (NB-IoT), into a UART protocol to transmit it to the communication port 140.

The communication module 120 performs protocol conversion on the operation state information received from the communication port 140. The communication module 120 converts the operation state information of the UART protocol type into a protocol supported by the communication module 120. The communication module 120 transmits the converted operation state information through the antenna to transmit it to a control unit.

The communication port 140 is composed of a port that can be connected to a designated separate communication module 120. At this time, the communication port 140 is a communication port 140 connected with the communication module 120 by a wire, wireless, and wired/wireless, such as LoRa, ZigBee, PLC, and Wi-Fi, Herein, the communication port 140 is, for example, the communication port 140 of any one of a UART port, an RS-232C port, and an I2c port.

The communication port 140 is connected with the communication module 120 to communicate with the server and transmits and receives the control signal and the operation state information of the LED module 34. At this time, the communication port 140 receives the control signals related to lighting, blinking, dimming control, etc. from the communication module 120. The communication port 140 receives the operation state information of the LED module 34 from the control module 180 to transmit it to the communication module 120. The communication port 140 can share a command code with the communication module 120 for performing the above-described communication function.

The sensing module 160 senses and determines the state of the LED module 34. The sensing module 160 senses at least one of the voltage and the current of the LED module 34. The sensing module 160 determines whether the LED module 34 operates normally by using the sensed voltage and current.

The control module 180 is connected with the communication module 120 through the communication port 140 to transmit and receive the control signals and the operation state information. That is, the control module 180 is connected with the communication module 120 through the communication port 140 to receive a control signal for controlling the LED module 34. The control module 180 is connected with the communication module 120 through the communication port 140 to transmit the operation state information including a voltage, a current, whether the LED module 34 is normally operated, etc. sensed by the sensing module 160.

The control module 180 controls the LED module 34 according to the control signal. That is, the control module 180 lights or blinks the LED module 34 upon receiving the control signals related to driving such as blinking, lighting, and dimming control.

The control module 180 receives the control signal from a network server or an application server. The control module 180 receives the control signal including lighting rates (e.g., 10%, 50%, 100%) of the lighting.

The control module 180 sets a final command value to be transmitted to the LED module 34 based on the received control signal. For example, referring to the following Equation 1, the control module 180 sets the final command value (e.g., 2 A, 3 A, 4 A, etc. as a control current) by using a lighting rate, a lighting target, the number of lightings of the LED module 34, and a rated current.

$$\text{Control current} = \% \times a/b \times \text{rated current} \qquad \text{Equation 1}$$

Herein, % refers to a lighting rate, a to a value obtained by converting a lighting target into a binary number, and b to the total number of LED modules 34.

The control module 180 transmits the final command value to the power supply device 32 to control the lighting, blinking, dimming, and lighting rate of the LED module 34.

At this time, the sensing module 160 senses a voltage or a current for each LED module 34. The sensing module 160 compares the sensed voltage with a standard value (e.g., about 25V to 35V as a standard voltage) to determine whether each LED module 34 operates normally.

The sensing module 160 generates the operation state information according to the determination result. For example, when there are four LED modules 34, the sensing module 160 generates the operation state information that has converted whether to operate into binary numbers such as 1111, 1011, 1101, 0101, and 0111. The sensing module 160 can also generate by classifying the operation state information for each LED module 34.

The control module 180 transmits the operation state information generated by the sensing module 160 to the communication module 120 through the communication port 140. Therefore, the communication module 120 transmits the operation state information to the server. At this time, the control module 180 can record the operation state information for each LED module 34, record the system failure at the time of abnormal operation, and also transmit the information requesting the replacement progress of the LED module 34 through the communication port 140.

Meanwhile, when the lighting control device 100 is applied to a street lamp, a security light, and an indoor lighting apparatus, the lighting control device 100 can include an additional function such as a CCTV in addition to the state sensing of the LED module 34 according to various customer needs.

A lighting control device according to a second embodiment of the present disclosure replaces a power supply device mounted at the conventional lighting apparatus. The lighting control device can be formed in a board form unlike the conventional power supply device in a block form.

The lighting control device integrally includes a power supply module corresponding to the power supply device (SMPS), and includes a plurality of lighting ports to facilitate connection of the LED module.

Figure 5:
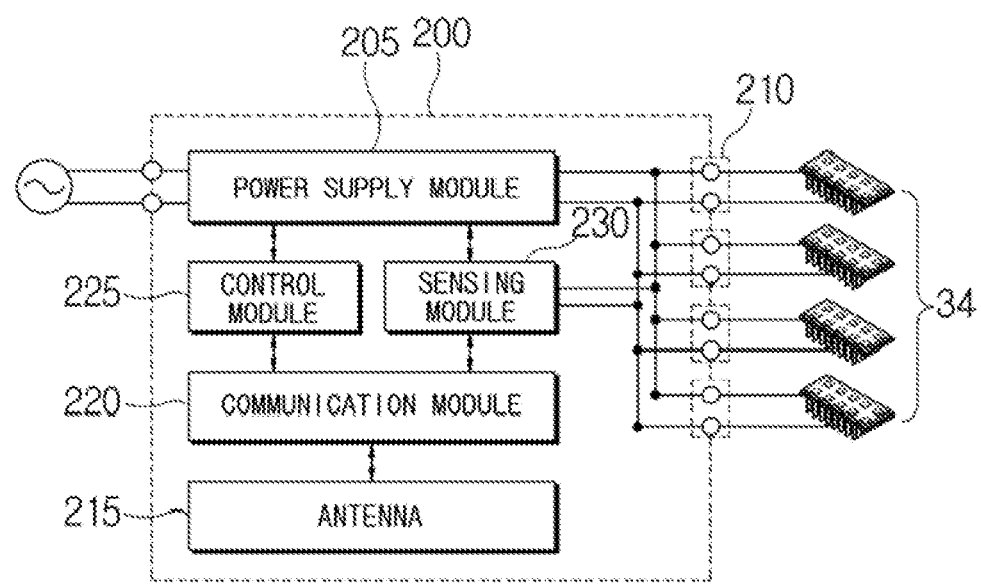
FIG. 5 is a diagram for explaining a lighting control device according to a second embodiment of the present disclosure.

Referring to FIG. 5, a lighting control device 200 according to the second embodiment of the present disclosure includes a power supply module 205, a plurality of lighting ports 210, an antenna 215, a communication module 220, a control module 225, and a sensing module 230. The lighting control device 200 is composed of one printed circuit board on which the power supply module 205, the plurality of lighting ports 210, the antenna 215, the communication module 220, the control module 225, and the sensing module 230 are formed.

The power supply module 205 supplies power to a plurality of LED modules. The power supply module 205 receives AC power from an external power source of the power supply module 205. The power supply module 205 converts the AC power into DC power.

The power supply module 205 outputs the converted DC power to the plurality of LED modules. The power supply module 205 outputs the DC power having a setting voltage and a setting current by a control of the control module 225. The DC power output from the power supply module 205 has, for example, a voltage value of about 30V and a current value of about 2.8 A.

The power supply module 205 outputs the DC power having the same current value to the plurality of LED modules by the control of the control module 225. The power supply module 205 outputs, for example, the DC power having a current value of about 0.7 A to each LED module when four LED modules are connected thereto.

The power supply module 205 can also output the DC power having a different current value from each of the plurality of LED modules by the control of the control module 225.

The lighting port 210 connects the power supply module 205 and the LED module. The lighting port 210 connects one LED module and the power supply module 205. The lighting port 210 is, for example, a connector that is easy to attach and detach the LED module.

The antenna 215 receives analog type control signals (hereinafter, referred to as analog control signals) transmitted from the control unit. The control signal includes the information for controlling one of the lighting, blinking, dimming, and a lighting rate of the LED module. The antenna 215 can be formed in various forms such as a patch form, a circuit board form, and a solenoid form.

Since the lighting apparatus is mainly installed outside, it includes a housing of a metal material in order to secure durability according to weather conditions. When the antenna 215 is installed inside the housing of the lighting apparatus, a signal is blocked by the housing of the metal material. Therefore, the lighting apparatus is preferably disposed outside the lighting apparatus.

Figure 6:
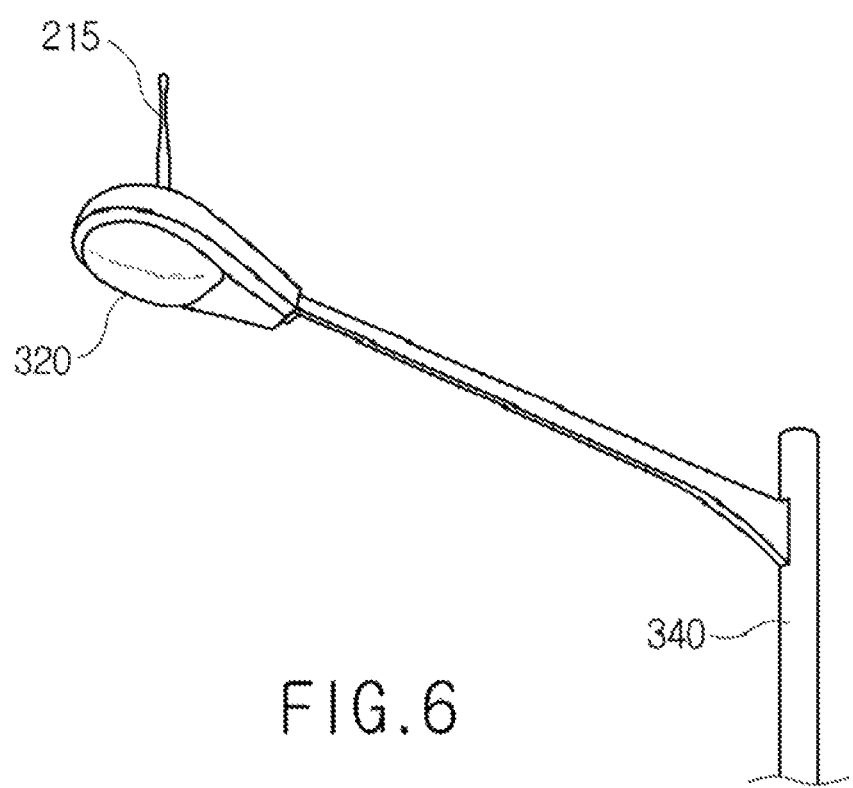
FIGS. 6 and 7 are diagrams for explaining an antenna in FIG. 5.

Referring to FIG. 6, the antenna 215 can be disposed outside the housing of a lamp head 320 where the LED lamp and the lighting control device 200 are mounted. The antenna 215 is connected with the lighting control device 200 (i.e., the communication module 220) disposed inside the housing of the lamp head 320 through a cable that passes through a hole formed in the housing of the lamp head 320.

Figure 7:
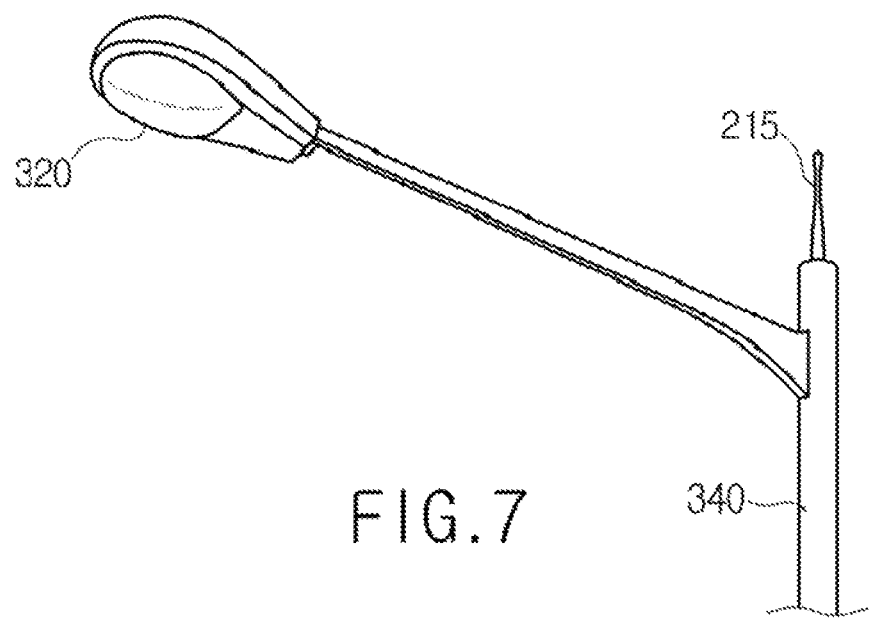

Referring to FIG. 7, the antenna 215 can also be disposed at a light pole (or a lamp post) 340 where a power cable is received. The antenna 215 is connected with the lighting control device 200 (i.e., the communication module 220) disposed inside the lamp housing through a cable that passes through a hole formed in the light pole 340.

The communication module 220 converts the analog control signal received from the antenna 215 into a digital type control signal. The communication module 220 transmits the converted control signal to the control module 225. The communication module 220 transmits the operation state information of the LED module received from the sensing module 230 through the antenna 215 to transmit it to the control unit.

The control module 225 controls the output of the power supply module 205. The control module 225 controls the DC power output from the power supply module 205 to the LED module.

The control module 225 controls the current value of the DC power. The control module 225 controls the current value of the DC power according to the number of the connected LED modules.

The control module 225 controls the power supply module 205 to output the DC power having the same current values to a plurality of LED modules. The control module 225 can also control the power supply module 205 to output the DC power having different current values from each other to the plurality of LED modules.

When three LED modules are connected, the control module 225 controls the power supply module 205 to output by adjusting the current value of the DC power to about 2.1 A in order to apply the DC power having the current value of about 0.7 A to each LED module.

The control module 225 controls the plurality of LED modules. The control module 225 controls the plurality of LED modules according to the control signal received from the control unit through the communication module 220. The control module 225 controls the lighting, blinking, dimming (brightness), and lighting rate of the plurality of LED modules.

The control module 225 controls the lighting and blinking of the LED module through the control of the power supply module 205. The control module 225 lights or blinks the plurality of LED modules collectively. The control module 225 controls, for example, the lighting and blinking of the LED module by turning on/off the output of the power supply module 205.

The control module 225 selectively lights or blinks the plurality of LED modules. The control module 225 turns on the output of the power supply module 205, and blocks or passes the DC power applied to each LED module, thereby selectively lighting or blinking some of the plurality of LED modules.

The control module 225 controls the dimming (brightness) of the LED module through the control of the power supply module 205. The control module 225 can collectively control the dimming of the plurality of LED modules. The control module 225 can selectively control the dimming of some of the plurality of LED modules.

The control module 225 controls, for example, the dimming (brightness) of the LED module by varying the ON/OFF duration of the DC power supplied from the power supply module 205 to the LED module.

For another example, the control module 225 controls the dimming of the LED module by varying the current of the DC power supplied from the power supply module 205 to the LED module.

The sensing module 230 senses the operation state information of the plurality of LED modules. The sensing module 230 senses a voltage, a current, etc. of the plurality of LED modules. The sensing module 230 determines the operation state of the LED module based on the sensed information to transmit it to the communication module 220.

Meanwhile, in a smart lighting system, various communication methods are applied for communication between the lighting apparatus and the control unit.

For example, the smart lighting system transmits and receives data in one communication method of a low power near-field wireless network IPv6 (6LoWPAN) and a low power wide area network (LPWAN).

A low power near-field wireless network IPv6 (6LoWPAN) signal can be one communication method of low power Bluetooth (BLE), Zigbee, and Z-Wave. The low power wide area network (LPWAN) can be one communication method of LoRaWAN, SIGFOX, and Narrowband Internet of Things (NB-IoT).

The lighting control device 200 can be required to change the communication module 220 according to the communication method required in the smart lighting system, thereby reducing the productivity.

Figure 8:
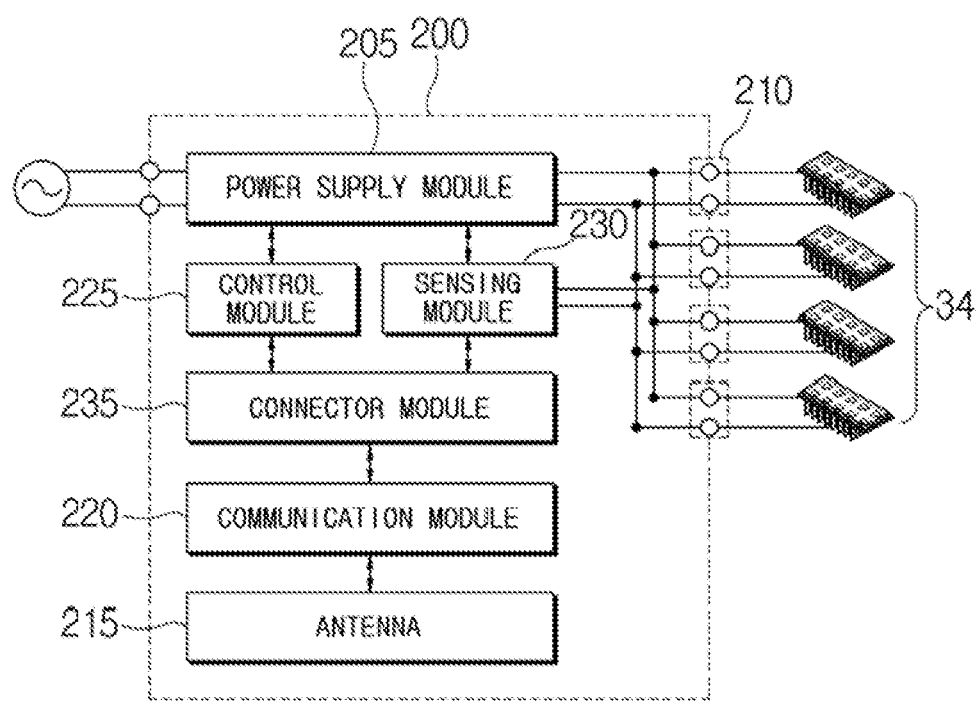
FIGS. 8 to 10 are diagrams for explaining a modified example of the lighting control device according to the second embodiment of the present disclosure.

Therefore, referring to FIG. 8, the lighting control device 200 according to the second embodiment of the present disclosure can further include a connector module 235. The connector module 235 is a configuration for allowing the communication module 220 to be replaced according to a communication method required for communication between the lighting apparatus and the control unit.

The connector module 235 includes a connector to which the communication module 220 can be detachably attached. The connector module 235 transmits the control signal received from the communication module 220 to the control module 225. The connector module 235 transmits the operation state information received from the sensing module 230 to the communication module 220. At this time, the connector module 235 is, for example, a UART port. The connector module 235 transmits and receives the control signals and the operation state information in the UART protocol format.

The communication module 220 converts the analog control signal received from the antenna 215 into a digital type control signal. The communication module 220 converts a protocol of the control signal to transmit it to the connector module 235. For example, the communication module 220 converts the control signal, which is a protocol of one of low power Bluetooth (BLE), Zigbee, Z-Wave, LoRaWAN, SIGFOX, and Narrowband Internet of Things (NB-IoT) into a UART protocol to transmit it to the connector module 235.

The communication module 220 protocol-converts the operation state information received from the connector module 235. The communication module 220 converts the operation state information of the UART protocol type into a protocol supported by the communication module 220. The communication module 220 transmits the converted operation state information through the antenna 215 to transmit it to the control unit.

The communication module 220 is formed of a device separately from other modules or a printed circuit board.

Figure 9:
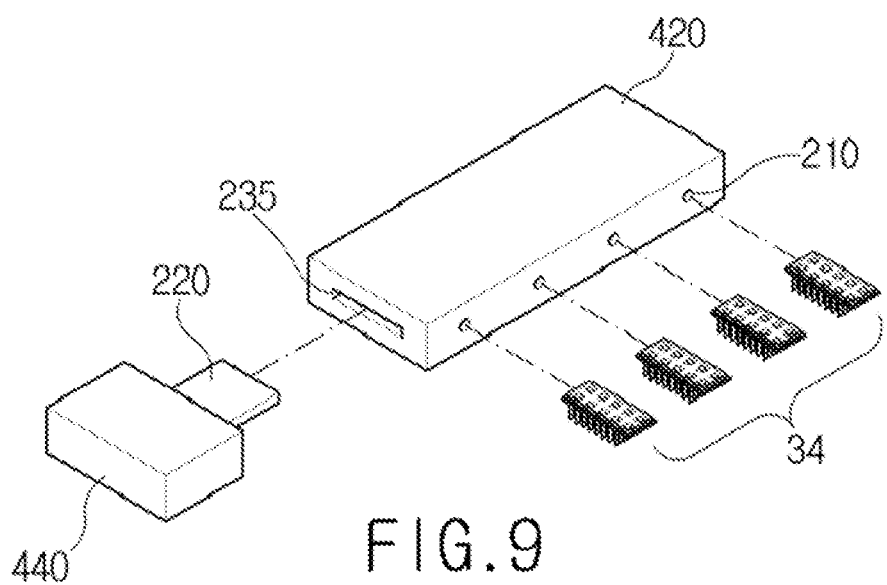

For example, referring to FIG. 9, a main terminal 420 includes the power supply module 205, the plurality of lighting ports 210, the antenna 215, the connector module 235, the control module 225, and the sensing module 230. The main terminal 420 has a structure in which the plurality of the lighting ports 210 and the connector module 235 are exposed to the outside so that the LED module and the communication module 220 are easily attached detachably.

A sub terminal 440 is detachably attached to the main terminal 420. The sub terminal 440 is connected to the connector of the connector module 235 exposed to the outside of the main terminal 420. As the sub terminal 440 is connected to the main terminal 420, the communication module 220 is connected with the connector module 235 to transmit and receive data (e.g., the control signal, the operation state information, etc.).

Figure 10:
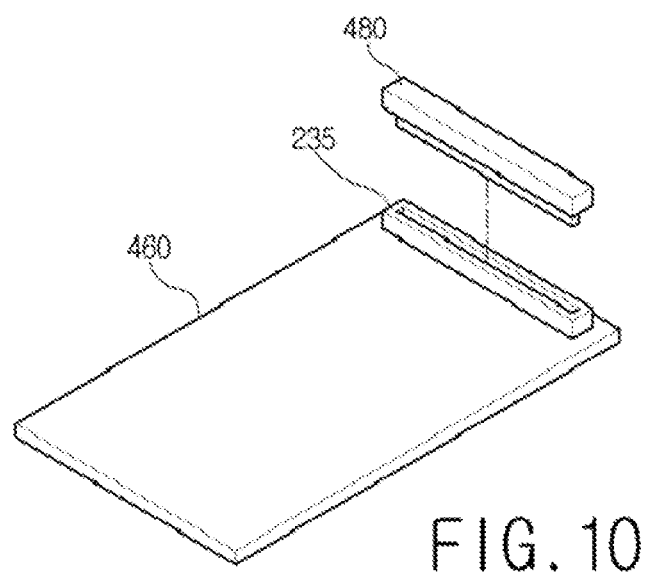

For another example, referring to FIG. 10, a first printed circuit board 460 includes the power supply module 205, the plurality of lighting ports 210, the antenna 215, the connector module 235, the control module 225, and the sensing module 230. A second printed circuit board 480 includes the communication module 220. The second printed circuit board 480 is connected to the connector of the connector module 235 formed on the first printed circuit board 460. As the first printed circuit board 460 and the second printed circuit board 480 are connected to each other, the communication module 220 and the connector module 235 transmit and receive data therebetween.

As described above, the lighting control device 200 according to the second embodiment of the present disclosure can separately form the communication module 220 to be replaced according to the communication method, thereby preventing a reduction in productivity due to a change in the communication module 220.

Figure 11:
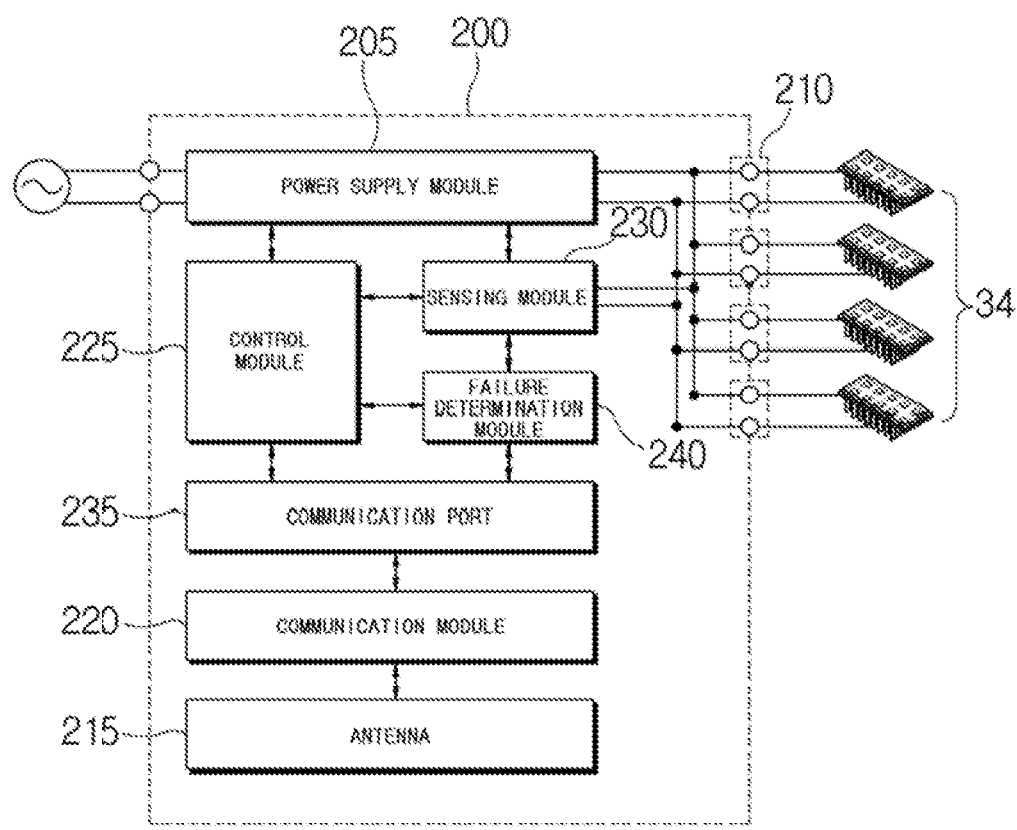
FIGS. 11 and 12 are diagrams for explaining another modified example of the lighting control device according to the second embodiment of the present disclosure.

Referring to FIG. 11, the lighting control device 200 according to the second embodiment of the present disclosure can further include a failure determination module 240.

The failure determination module 240 determines whether the LED module connected to the lighting port 210 has failed. The failure determination module 240 determines whether the LED module has failed based on the operation state information sensed by the sensing module 230.

The failure determination module 240 generates failure information including the lighting port 210 and the operation state information to which the LED module determined as the failure has been connected. The failure determination module 240 transmits the failure information to the communication port.

The communication port transmits the failure information received from the failure determination module 240 to the communication module 220 after converting the protocol. The communication module 220 transmits the received failure information to the control unit.

The failure determination module 240 determines the number of normally operating LED modules based on whether it has been a failure. The number of LED modules determined as a failure is subtracted from the number of LED modules connected to the lighting port 210 of the failure determination module 240 to determine the number of normal operation of the LED) module. The failure determination module 240 transmits the control information including the lighting port 210 and the number of normal operations, to which the normally operating LED module is connected, to the control module 225.

The control module 225 controls the output of the power supply module 205 based on the control information received from the failure determination module 240. The control module 225 controls the DC power output from the power supply module 205 to the LED module based on the control information. The control module 225 controls the current value of the DC power.

The control module 225 controls the current value of the DC power based on the number of normal operations included in the control information. The control module 225 controls the current value of the DC power based on the number of normal operations and the maximum driving current of the LED module. The control module 225 controls the power supply module 205 to output the DC power having a current value equal to or lower than a value obtained by multiplying the driving current by the number of normal operations.

For example, it is assumed that four LED modules having an operating current of 0.7 A are connected to the connector module 235.

When all of the LED modules operate normally, the failure determination module 240 transmits the control information including the number of normal operations "4" to the control module 225.

The control module 225 detects "4" that is the number of normal operations from the control information. The control module 225 sets 2.8 A obtained by multiplying the number of normal operations by 0.7 A that is the driving current of the LED module as the current value of the DC power output from the power supply module 205.

The power supply module 205 outputs the DC power having the current value of 2.8 A to the normally operating four LED modules. The DC power having the current value of 0.7 A is applied to the LED module, respectively.

Meanwhile, when one LED module fails, the failure determination module 240 transmits the control information including the number of normal operations "3" to the control module 225.

The control module 225 detects "3" that is the number of normal operations from the control information. The control module 225 sets 2.8 A obtained by multiplying the number of normal operations by 0.7 A that is the driving current of the LED module as the current value of the DC power output from the power supply module 205.

The power supply module 205 outputs the DC power having the current value of 2.8 A to the normally operating three LED modules. The DC power having the current value of 0.7 A is applied to the LED module, respectively.

As described above, the lighting control device 200 according to the second embodiment of the present disclosure can determine whether the LED module has failed to control the output of the power supply device, thereby preventing breakage and a reduction in life span of the LED module.

Figure 12:
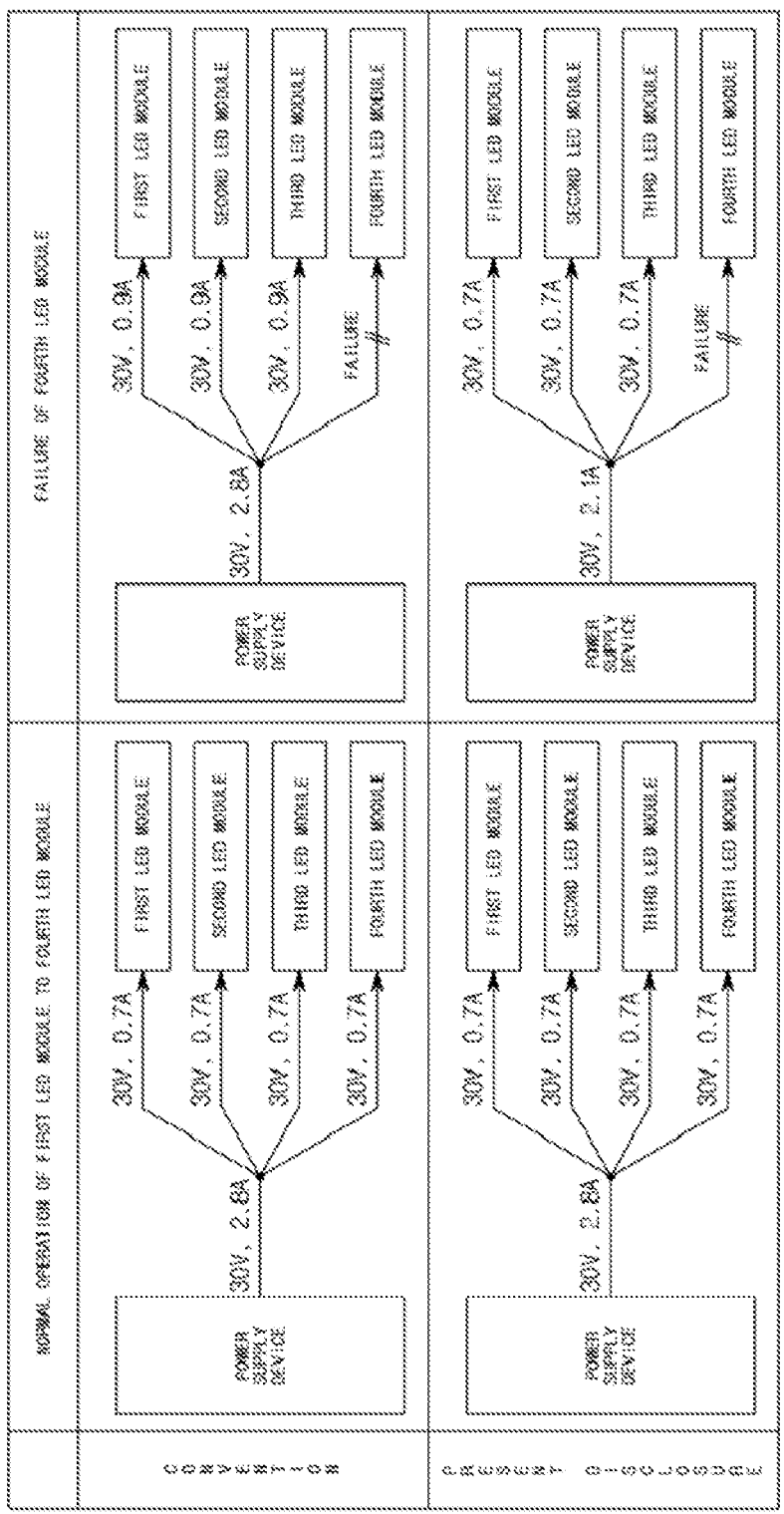

Referring to FIG. 12, the conventional lighting control device 200 and the lighting control device 200 according to the second embodiment of the present disclosure are compared as follows.

The conventional lighting control device 200 outputs the DC power having the current value of about a predetermined 2.8 A regardless of whether the LED module has failed.

When all of the first LED module to the fourth LED module connected to the power supply device are normally operated, the DC power having the current value of about 0.7 A is applied to the first LED module to the fourth LED module, respectively.

However, when the fourth LED module fails, the DC power having the current value of about 0.9 A is applied to the remaining LED) modules, respectively.

As a result, there occurs a problem in that the DC power having the current value exceeding the driving current is applied to the LED module, thereby causing a reduction in life span or breakage of the LED mixture.

The lighting control device 200 according to the second embodiment of the present disclosure controls the current value of the DC power outputted from the power supply module 205 when the LED module fails.

When all of the first LED module to the fourth LED module operate normally, the failure determination module 240 transmits the control information including the number of normal operations "4" to the control module 225.

The control module 225 detects "4" that is the number of normal operations from the control information. The control module 225 sets 2.8 A obtained by multiplying the number of normal operations by 0.7 A that is the driving current of the LED module as the current value of the DC power output from the power supply module 205.

The power supply module 205 outputs the DC power having the current value of 2.8 A. The DC power having the current value of 0.7 A is applied to the first LED module to the fourth LED module, respectively.

Meanwhile, when the fourth LED module fails, the failure determination module 240 transmits the control information including the number of normal operations "3" to the control module 225.

The control module 225 detects "3" that is the number of normal operations from the control information. The control module 225 sets 2.1 A obtained by multiplying the number of normal operations by 0.7 A that is the driving current of the LED module as the current value of the DC power output from the power supply module 205.

The power supply module 205 outputs the DC power having the current value of 2.1 A. The DC power having the current value of 0.7 A is applied to the first LED module to the third LED module, respectively.

As described above, it is possible for the lighting control device 200 according to the second embodiment of the present disclosure to monitor the operation state of the LED module to determine whether the LED module has failed, thereby controlling the output of the power supply module 205 to apply the power having a constant current value to the LED module.

In addition, it is possible for the lighting control device 200 according to the second embodiment of the present disclosure to control the output of the power supply module 205 to apply a constant current value to the LED module, thereby preventing the power having the current value exceeding the driving current from being supplied to other LED modules when a failure occurs to prevent breakage and a reduction in life span of the LED module.

Figure 13:
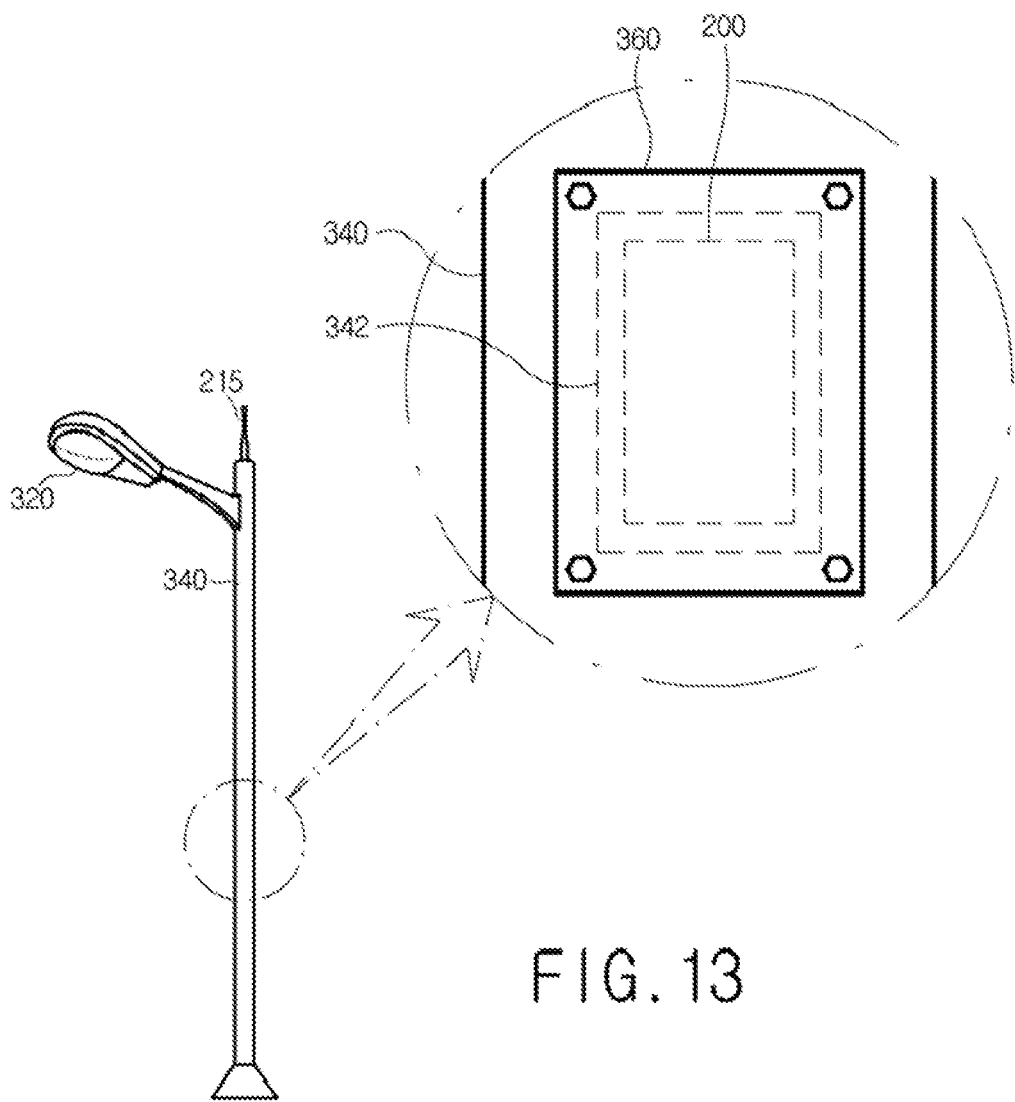
FIG. 13 is a diagram for explaining a lighting apparatus including the lighting control device according to an embodiment of the present disclosure.

Referring to FIG. 13, a lighting apparatus according to an embodiment of the present disclosure disposes the lighting control device 200 at the light pole 340. Hereinafter, the lighting apparatus will be described as a street lamp, for example.

The administrator should replace the corresponding part when the part constituting the street lamp fails. The power supply module 205 (or the power supply device (SMPS)) is a part that a failure occurs most frequently among the parts constituting the street lamp. Since the power supply module 205 is mainly disposed at the lamp head 320, it is difficult to replace it when a failure occurs.

Therefore, the lighting control device 200 can be disposed at the light pole 340 of the street lamp. The lighting control device 200 is inserted into and mounted in an insertion hole 342 formed in the light pole 340. The insertion hole 342 into which the lighting control device 200 has been inserted is sealed by a cover 360.

As described above, it is possible for the lighting control device 200 according to the second embodiment of the present disclosure to be disposed at the light pole 340 of the street lamp, thereby facilitating maintenance by easily replacing it when a fault occurs.

As described above, although preferred embodiments of the present disclosure have been described, it is to be understood that they can be modified into various forms, and various modifications and changes thereof can be embodied by those skilled in the art without departing from the claims of the present disclosure.

The invention claimed is:

1. A lighting control device for controlling a lighting apparatus connected to a smart lighting system, comprising:
a plurality of lighting ports to which a LED module is connected;
a power supply module for outputting power to the LED module through the plurality of lighting ports;
a control module for controlling an operation state of the LED module based on a control signal of the smart lighting system; and
a sensing module for sensing the operation state of the LED module that operates according to a control of the control module,
wherein the control module calculates a control current by multiplying a light rate, a rated current and a value obtained by dividing a lighting target by to a total number of LED modules, and sets the control current as a final command value, and
wherein the power supply module outputs a DC power having the control current of the final command value to the LED module.

2. The lighting control device of claim 1, wherein the setting current varies based on one of a number of the LED modules connected to the plurality of lighting ports and a number of the normally operating LED modules.

3. The lighting control device of claim 1, further comprising a failure determination module for determining whether the LED module connected to the plurality of lighting ports has failed based on the operation state sensed by the sensing module.

4. The lighting control device of claim 3, wherein the control module varies a setting current of the DC power outputted from the power supply module based on the determination result of the failure determination module.

5. The lighting control device of claim 3, wherein the control module subtracts a driving current of the LED module determined as a failure by the failure determination module from a setting current to calculate a subtraction value and sets the subtraction value as the setting current of the DC power outputted from the power supply module.

6. The lighting control device of claim 1, wherein the control module sets a current value obtained by summing driving currents of a normally operating LED modules among the LED modules connected to the plurality of lighting ports as a setting current of the DC power outputted from the power supply module.

7. The lighting control device of claim 1, further comprising a failure determination module for determining a number of the normally operating LED modules based on the operation state sensed by the sensing module.

8. The lighting control device of claim 7, wherein the control module controls a setting current of the DC power outputted from the power supply module based on the number of the normally operating LED modules.

9. The lighting control device of claim 7, wherein the control module sets a value obtained by multiplying the number of the normally operating LED modules by a driving current as a setting current of the DC power outputted from the power supply module.

10. The lighting control device of claim 1, wherein the sensing module senses at least one of a voltage and a current of the LED module connected to the plurality of lighting ports.

11. The lighting control device of claim 1, wherein the control signal comprises control information of at least one of lighting, blinking, dimming, and a lighting rate of the LED module.

12. The lighting control device of claim 1, further comprising a connector module to which a separate-type communication module is connected, and the connector module configured to connect the separate-type communication module to the control module.

13. The lighting control device of claim 1, further comprising an antenna disposed at one of a lamp head and a light pole of the lighting apparatus, and the antenna configured to transmit the control signal received from the smart lighting system to a communication module.

14. A lighting apparatus, comprising:
a lamp head at which a plurality of LED lamps are disposed;
a lighting control device for controlling the plurality of LED lamps; and
a light pole having one end connected with the lamp head,
wherein the lighting control device comprises
a plurality of lighting ports to which a LED module is connected:
a power supply module for outputting power to the LED module through the plurality of lighting ports;
a control module for controlling an operation state of the LED module based on a control signal of a smart lighting system; and
a sensing module for sensing the operation state of the LED module that operates according to a control of the control module,
wherein the control module calculates a control current by multiplying a lighting rate, a rated current and a value obtained by dividing a lighting target by a total number of LED modules, and sets the control current as a final command value,
wherein the power supply module outputs a DC power having the control current of the final command value to the LED module.

15. The lighting apparatus of claim 14, wherein the lighting control device is disposed at one of the lamp head and the light pole.

16. The lighting apparatus of claim 14, further comprising an insertion hole formed adjacent to other end of the light pole, and into which the lighting control device is inserted; and
a cover connected to the light pole to seal the insertion hole.

* * * * *